Oct. 18, 1966 T. E. FIDDLER 3,279,013
FASTENER FOR MOLDINGS
Filed Aug. 6, 1965
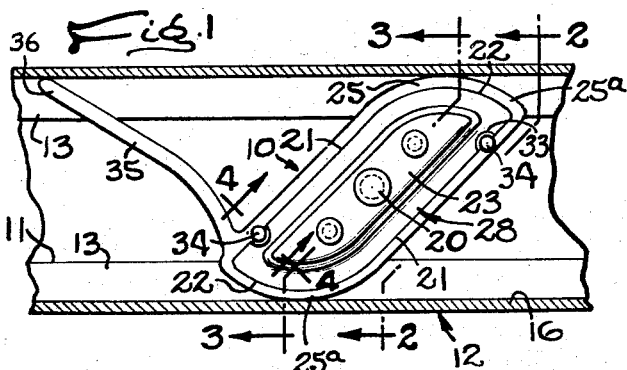
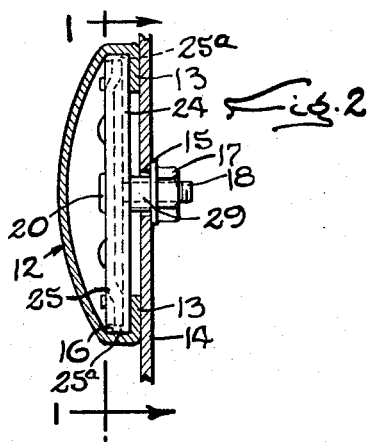
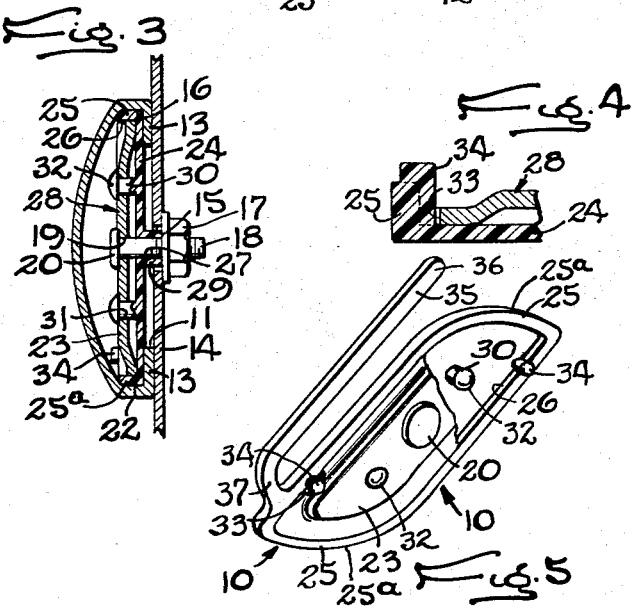
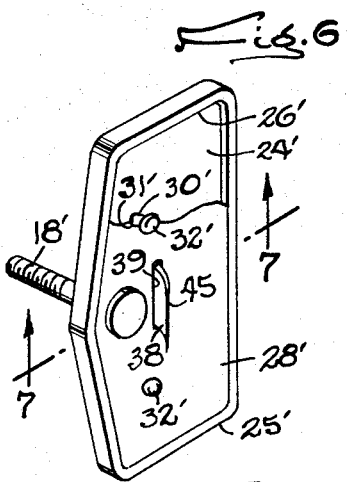
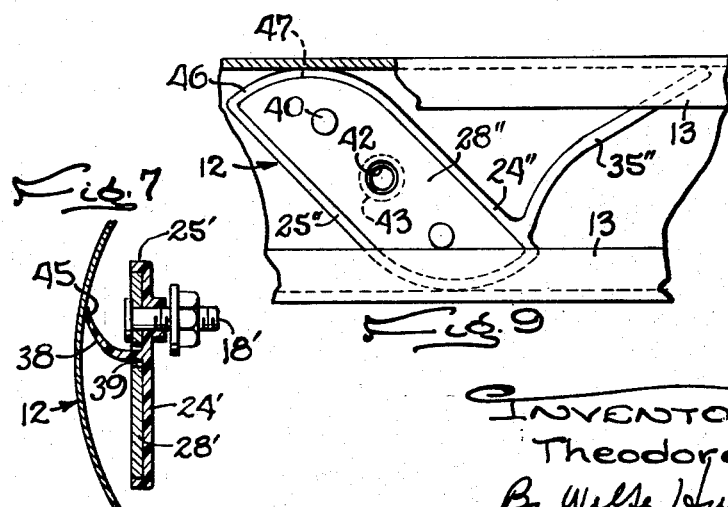
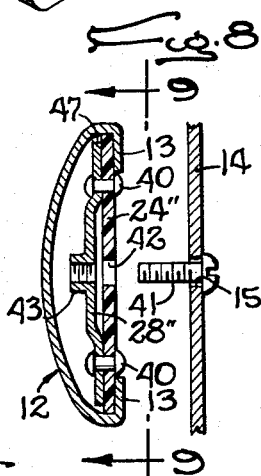
INVENTOR
Theodore E. Fiddler
By Wolfe, Hubbard, Voit & Osann
ATTORNEY 3,279,013
FASTENER FOR MOLDINGS
Theodore E. Fiddler, 1600 N. Woodward Ave.,
Birmingham, Mich.
Filed Aug. 6, 1965, Ser. No. 477,888
11 Claims. (Cl. 24—73)

This application is a continuation-in-part of my copending applications Serial Nos. 279,553, filed May 10, 1963, and 346,958, filed February 24, 1964, both these applications having now been abandoned, and the former of these applications being in turn a continuation-in-part of my application Serial No. 165,605, filed January 11, 1962, which has matured as Patent No. 3,186,049, dated June 1, 1965.

The invention relates to fastening devices or so-called clips, commonly used on automobiles, appliances and the like to clamp a hollow channel-like molding or trim strip against the outer face of a support panel. Heretofore, such clips that have gone into actual commercial use have been composed of metal in order to be able to withstand the torque incident to final screw clamping of the molding to a supporting panel. Such clips comprise a large and relatively flat and oblong metal head rigid with a threaded stud and adapted to be inserted broadwise through the slot of the molding channel and then turned within the channel to bring the ends into abutting engagement with the internal side walls of the molding, this position being retained by the action of a spring arm projecting from the clip head.

While all-metal clips of the above character are capable of withstanding the torsional strains incident to drawing the trim strip against the supporting panel, the contact between the dissimilar metals of the molding and the clip is conducive to electrolytic action in the presence of moisture, the resulting corrosion detracting from the decorative appearance of the trim in prolonged service use.

The general object is to preserve the strength, rigidity and torque resisting characteristics of an all-metal molding clip of the above character while separating and electrically isolating the metal head effectually from the molding in the final assembly through the use of the metal head of the former clips as a rigid backing for a member molded of synthetic resin coupled rigidly to the head and projecting radially only short distances beyond the ends of the head for engaging the molding walls and separating the head therefrom.

A more detailed object is to seat the metal head in a socket defined by narrow rims or beads upstanding from a molded plastic plate and extending around the ends of the head so as to be compressed radially between such ends and the molding walls in the final molding and panel assembly.

A further object is to provide for temporarily holding the metal backed plastic head within the molding channel by a resilient spring arm composed of plastic and molded integral with the plastic of the oblong contact plate.

The invention also resides in the novel construction of the resilient arm and the manner of joining the plastic plate and metal head together.

Other objects and advantages of the invention will become apparent from the following detailed description taken in connection with the accompanying drawings, in which FIGURE 1 is a fragmentary longitudinal sectional view through a molding and panel assembly equipped with a clip embodying the novel features of the present invention, the section being taken along the line 1—1 of FIG. 2.

FIGS. 2, 3 and 4 are sections taken respectively along the lines 2—2, 3—3 and 4—4 of FIG. 1.

FIG. 5 is a fragmentary perspective view of the improved clip.

FIG. 6 is a perspective view similar to FIG. 5 showing a modification.

FIG. 7 is a fragmentary section taken along the line 7—7 of FIG. 6 after assembly of the clip in a molding.

FIG. 8 is an exploded cross-section of another modification.

FIG. 9 is a fragmentary section taken along the line 9—9 of FIG. 8.

The invention is shown in the drawings incorporated in a clip assembly 10 (FIG. 5) adapted for broadwise insertion through a slot 11 (FIG. 1) in one face of a channel-like molding or trim strip 12 and to be drawn against the backs of flanges 13 thereon to clamp the molding against a supporting panel 14. The clamping is effected by tightening coacting sets of threaded fastening elements extended through holes 15 in the panel. The flanges 13 usually lie in a common plane and are turned inwardly from the edges of side walls 16 of the molding.

In the preferred form shown in FIGS. 1 to 5, the fastening elements include a nut 17 threaded onto a stud 18 which projects through the panel hole 15 and is made rigid at one end with an oblong and relatively flat metal head 28. This may be accomplished by cold forging the head and stud as one integral piece in the case of small clips, but for larger sizes as shown in FIGS. 1 to 5, the stud projects through a hole 19 in the head with an enlargement 20 thereon swaged or otherwise deformed to couple the stud rigidly to the head. The head is a generally flat plate of metal of a width somewhat less than that of the slot 11 in the trim strip and of a length greater than the spacing of the internal walls 16 of the strip. Opposite side edges 21 of the head are substantially parallel, while the ends 22 are gradually curved tangentially from one side edge 21 to intersect the end of the opposite side substantially perpendicular thereto. To stiffen the head and enable the same to be made of minimum thickness, a central portion corresponding in peripheral shape to the head is deformed or embossed as indicated at 23.

In accordance with the present invention, the metal head 28 forms a rigid backing for an oblong insulating plate 24 molded of resilient synthetic resin and coupled rigidly to the head to sustain the torque incident to clamping the clip against the molding flanges. It is made somewhat longer, at least at the ends, than the head 28 so as to provide in the final clip assembly edge areas 25ª closely following around the ends 22 of the head and projecting outwardly short distances therefrom. The end areas are thus adapted for abutting edgewise engagement with the molding walls 16 in the final clip and molding assembly and thus maintain the metal of the head effectually separated from the molding.

Preferably, the end areas 25ª are the outer surfaces of narrow end portions of a bead 25 molded integral with the ends of the plastic plate 24 and are raised from the latter at least across the ends 22 of the metal head 28. The bead 25 is generally square in cross-section, is disposed close to or in actual contact with the ends 22 of the head, and cooperates with the plate to define a socket 26 in which the metal head fits closely and is securely seated. Preferably, though not necessarily, the bead extends uninterruptedly around the entire periphery of the head. A hole 27 molded in the plate 24 is somewhat larger than the shank of the stud 18 adjacent the head 28 and receives the stud loosely when the metal head and plastic plate are assembled with the head seated in the socket 26. If desired, a short sleeve 29 may be molded around the hole for projection partially through the panel hole 15 in the final assembly (FIG. 3).

With the metal head 28 seated in the socket 26, the plastic plate will be coupled effectually with the head and stud.

Thus, the torque applied to the stud as the nut 17 is tightened after positioning the molding on the panel 14 is transmitted by radial compression of the end portions of the bead 25 between the edges 22 of the metal head 28 and the walls 16 of the molding. The torque resistance of the combined plate and head assembly is thus virtually equal to that of the metal head alone.

The head 28 and plastic plate 24 may be joined face to face into a unitary assembly (FIG. 5) in various ways. One way as shown herein is to mold on the plate within the socket 26 short upstanding posts or lugs 30 disposed between the stud and the ends 22 of the head and spaced apart to correspond to the locations of somewhat larger holes 31 punched or otherwise formed in the metal head. As the stud is inserted through the hole 27 in the plastic plate with the head alined with the socket so as to become seated therein, the posts 30 become projected through the holes 31. The projecting ends 32 of the posts are then enlarged as by peening over the plastic above the exposed face of the head 28 as by thermal softening of the plastic. At least a part of the enlargement overlies the defining edge of the hole 31, the head and plate being, in effect, riveted securely together with curved edges 22 at the ends of the head in substantial contact with the beads 25.

Alternatively, notches 33 may be formed in the peripheral edge of the head 28 in positions to receive lugs 34 molded on and upstanding from the plate intermediate the ends of the sides 21 of the head. These lugs are somewhat longer than the thickness of the head so that the projecting ends may be enlarged as by peening or softening of the plastic so as to overlie edge portions of the head and lock the same securely in the socket.

A resilient spring arm projecting from the clip 10 coacts with interior of the molding to create enough friction to maintain the clip in a definite position along the molding after insertion thereof through the slot 11 and turning the clip to bring the bead ends 25ª into abutment with the channel walls 16. In the preferred form shown in FIGS. 1 to 5, this arm, indicated at 35, is molded integral with and projects cantilever fashion from the periphery of the plastic plate 24 so as to be swingable substantially in the plane thereof. Herein, the arm in the molded position is substantially straight and extends along one straight side (FIG. 5) of the plastic plate and is spaced a short distance therefrom. The end 36 of the arm is free and, at its other end, the arm is curved as indicated at 37 and is integrally joined to the bead along the straight side thereof, in this instance near the one outer end of the plate 24. The arm thus formed may be bent outwardly and reversely away from the clip proper as shown in FIG. 1 and thus stressed to provide the torque required for turning the clip 10 counterclockwise after insertion thereof through the slot 11 so as to bring the end beads 25 into tight abutment with the internal walls 16 of the molding. The arm is held bent reversely while the clip is being inserted broadwise through the molding slot. After being released, the arm swings outwardly against one wall 16 of the molding and thus becomes effective to turn the clip counterclockwise as viewed in FIG. 1 and bring both of the bead ends 25 against the molding walls 16, the three points of engagement between these walls and the arm and the clip being spaced along the molding as shown in FIG. 1. The clip is now held frictionally but securely in a selected position along the molding for entry of the stud through the proper hole in the supporting panel as the molding, with a series of clips properly spaced therealong, is pressed onto the panel.

The friction necessary for holding the clip in any selected position along the molding may also be produced by an arm 38 (FIGS. 6 and 7) molded integral with the plastic plate and bendable in a plane extending transversely of the plate and the molding. In this modification, the parts corresponding to the form first described are indicated by the same but primed numbers. The arm 38 is molded integral with a central part of the plate 24' and projects through a hole 39 stamped in the metal head 28'. The arm is inclined relative to the clip and the free end 45 thereof is spaced from the metal head 28' a distance somewhat greater than the depth of the molding channel 12 so as to engage the bottom of this channel during insertion of the clip into the molding and become flexed as shown in FIG. 7 as the clip becomes fully entered. After such insertion, the clip is turned to bring the ends of the plastic plate against the molding walls 16 and behind the flanges 13. In this position, the bent arm presses the clip ends against the backs of the flanges 13, thus maintaining the position of the clip until after the molding is pressed onto the support panel 14. Then, as nuts are tightened onto the studs 18', the clips are turned to bring the end beads 25' into abutment with the channel walls 16 and thus develop the torque resistance necessary for enabling the nuts to be tightened and the molding to be clamped securely against the panel.

The use of the narrow bead 25 above described imparts optimum torque transmitting capacity to the clip even though the plastic plate 24 is made relatively thin. Proper isolation of the metal head 28 from the molding and ample torque transmitting capacity may be achieved however by making the oblong plastic plate somewhat thicker while omitting the beading 25. Such a modification is shown in FIGS. 8 and 9 in which the plate 24" is relatively flat and, as before, somewhat larger than the metal head 28" so that ends 46 thereof project short distances beyond the ends 47 of the head and hold the latter out of contact with the molding walls 16. The metal head and the plastic plate may, if desired, be secured together by separate rivets 40 in place of the posts 30 above described. Also, a screw 41 for clamping the clip head against the molding flanges may be a separate element projected through the panel hole 15, a hole 42 in the plastic plate and screwed into a sleeve 43 formed integral with the metal head and projecting toward the bottom of the molding channel. As before, a suitable spring arm 35" is molded integral with the periphery of the plastic plate 24" along one straight edge thereof and acts in the same manner as the arm 35 to turn the clip and maintain its position after insertion in the molding as shown in FIG. 9.

It will be apparent that the clip in the forms shown is a rigid unitary assembly capable of sustaining the torque applied in tightening the fastening devices after insertion of the clip in the molding while effectually holding the oblong metal out of contact with the molding. At the same time, enough friction is created through the resiliency of the spring arms 35, 38 or 35" to hold the clip position in the molding pending attachment of the latter to the panel.

I claim as my invention:

1. A clip for use in clamping a molding channel against a supporting panel wherein said channel has edge flanges turned inwardly from its side walls and defining a slot narrower than the molding, said clip comprising an oblong plate of resilient plastic material narrower in width and longer than the width of said slot and insertable broadwise therethrough and adapted for seating of the edges of the plate ends against the side walls of the channel upon edgewise turning of the plate after such insertion, a substantially flat metal head oblong in shape but shorter than said plate and lying against the back face of the plate, the ends of said head following the contour of said plate ends at least around the area of engagement thereof with said channel walls whereby to provide a rigid axial backing for said plate extending outward radially and substantially to the outer ends thereof, means securing said plate and head rigidly together against relative angular turning, and a metal fastening element rigid with said head and alined with a hole in said plate for interengagement with a coacting fastening element by which the head and plate assembly may be clamped against the back of said flanges and the molding against said panel with said metal head separated from the walls of the molding.

2. A molding clip as defined in claim 1 including a resilient spring arm molded integral with said plastic plate and bendable laterally for engagement with the interior of a molding to create friction for maintaining the position of the inserted clip along the molding.

3. A molding clip as defined in claim 2 in which said spring arm is molded integral at one end with the periphery of the plastic plate for bending of the arm substantially in the plane of the plate.

4. A molding clip as defined in claim 1 including a bead molded integral with and having portions upstanding from said plastic plate and across the edges of said head at least around the periphery thereof at the points of contact of the plate periphery with the opposed walls of said molding, said bead being disposed close to said head ends so as to be compressed thereby against the molding walls by turning of the clip within the molding.

5. A molding clip as defined in claim 4 in which said bead extends around substantially the entire periphery of said plastic plate.

6. A molding clip as defined in claim 1 in which said plastic plate is molded with peripheral edge portions upstanding across and disposed close to and closely following around the peripheral contour of said metal head to define an oblong socket in which said oblong metal head fits closely.

7. A molding clip as defined in claim 4 including a spring arm molded integral at one end with said bead for flexing substantially in the plane thereof.

8. A molding as defined in claim 4 in which said bead extends uninterruptedly around the entire periphery of said plastic plate and closely follows the periphery of said metal head, said clip including a spring arm molded integral with said head along one of the elongated sides of the clip and being bendable outwardly from such side substantially in the plane of the clip.

9. A molding clip as defined in claim 1 including a plurality of laterally spaced lugs molded integral with said plate and upstanding therefrom across edges of said metal head, the ends of said lugs above said head being enlarged to overlie the head and secure the head against said plate.

10. A molding clip as defined in claim 9 in which said lugs project across the longer edges of said head between said outer ends of said plastic plate.

11. A clip for use in clamping a molding channel against a supporting panel wherein said channel has edge flanges turned inwardly from its side walls and defining a slot narrower than the molding, said clip comprising a part made of resilient plastic material having a plate portion longer than the width of said slot, said part being adapted to be disposed within said channel with the edges of the plate ends seated against the side walls of the channel, a substantially flat metal head shorter than said plate and lying against the back face of the plate, the ends of said head following the contour of said plate ends at least around the area of engagement thereof with said channel walls whereby to provide a rigid axial backing for said plate extending outwardly from the center and substantially to the outer ends thereof, means securing said plate and head rigidly together against relative angular turning, and a metal fastening element rigid with said head and adjacent a hole in said plate for interengagement with a coacting fastening element by which the head and plate assembly may be clamped against the back of said flanges and the molding against said panel with said metal head separated from the walls of the molding.

References Cited by the Examiner
UNITED STATES PATENTS
3,137,048  6/1964  Bedford _____ 24—73

WILLIAM FELDMAN, *Primary Examiner.*

E. SIMONSEN, *Assistant Examiner.*